Patented Sept. 18, 1945

2,384,884

UNITED STATES PATENT OFFICE 2,384,884

VINYLIDENE CHLORIDE COMPOSITIONS

Edgar C. Britton and Harold W. Moll, Midland, Mich., assignors to The Dow Chemical Company, Midland, Mich., a corporation of Michigan No Drawing. Application July 18, 1941,
Serial No. 403,016

4 Claims. (Cl. 260—42)

This invention relates to thermoplastic compositions comprising polymeric vinylidene chloride products modified with polyvinyl acetal resins.

As herein used, the term "polymeric vinylidene chloride product" includes the polymer of vinylidene chloride alone and other products, whether polymers, co-polymers, interpolymers, or otherwise named, which may be obtained by polymerizing together monomeric vinylidene chloride and one or more of the monomers of other polymerizable materials, such as vinyl chloride, vinyl acetate, vinyl ethers, acrylic and methacrylic acids and esters thereof, acrylic nitrile, butadiene, styrene, allyl chloride and the allyl, methallyl, crotonyl, 2-chloroallyl, or cinnamyl esters of mono and dicarboxylic acids. The polymer of vinylidene chloride alone is described in U. S. Patent No. 2,160,903 and many of its co-polymers with other polymerizable compounds, as well as certain plasticized compositions comprising these co-polymers, and ways in which the products may be made, are described in U. S. Patents 2,160,904; 2,206,022; 2,215,379 and 2,160,931 to 2,160,948, inclusive.

Polyvinyl acetal resins are the products obtained by hydrolyzing a polyvinyl acetate resin and condensing the hydrolyzed product with aldehydes. In commercial production neither the hydrolysis nor the condensation is carried to completion. The final product contains some acetyl and some hydroxy groups as well as the acetal groups.

According to the present invention polyvinyl acetal resins are incorporated with a polymeric vinylidene chloride product to produce a mass which can be molded or extruded to form articles having a waxy "handle" and a high gloss. For example, a polyvinyl acetal resin may be incorporated with a polymeric vinylidene chloride product to produce a mass that can easily be extruded to form threads, bands, filaments, foils, and the like which are flexible, translucent objects and which retain the high tensile strength shown by similar articles prepared from the polymeric vinylidene chloride product alone. Furthermore, articles made from the compositions prepared according to the present invention retain a resistance to chemicals typical of polymeric vinylidene chloride products. In many instances the polyvinyl acetal resins are not completely compatible at room temperature with the polymeric vinylidene chloride products and produce masses which can be molded or extruded to form articles that have a translucent white appearance when cold and which have a durable finish.

The addition of the polyvinyl acetal resins to the polymeric vinylidene chloride product may be effected by any of several methods. For example, the polymeric vinylidene chloride product and the particular polyvinyl acetal resin to be employed may be mixed or ground together in a ball mill or other suitable mixer commonly employed in the plastic art, or they may be added to the polymer on hot rolls in a method similar to compounding rubber compositions. Another satisfactory method of incorporating the polyvinyl acetal resin with the polymeric vinylidene chloride product is to dissolve the resin in a readily volatile solvent and mix or grind the materials in any suitable apparatus such as a ball mill, thereafter evaporating the solvent. To effect complete homogenization of the composition, it should preferably be heated to a fusion temperature.

The following examples illustrate the practice of the invention but are not to be construed as limiting the scope thereof:

Example 1

2.5 grams of Alvar 15–70, a polyvinyl acetal resin prepared from polyvinyl acetate and acetaldehyde, and which had a melting point above 170° C. and 5.0 grams of 1,2-epoxy-3-(2-phenylphenoxy) propane, to serve as a heat stabilizer, were incorporated with 20 milliliters of acetone. To this solution was added 42.5 grams of a co-polymer consisting of 90 per cent vinylidene chloride and 10 per cent vinyl chloride. The mixture was ground until thoroughly blended and then dried. The composition could easily be molded or extruded and filaments, having a diameter of 0.0215 inch, prepared from this material were translucent flexible tough threads with a waxy handle and a glossy finish and had a tensile strength above 42,000 pounds per square inch.

Example 2

A composition was prepared as in Example 1 but substituting Formvar 7–90, a polyvinyl acetal resin prepared from polyvinyl acetate and formaldehyde, and which had a softening point of 120°–190° C., for the Alvar 15–70. The composition could easily be molded and extruded and filaments, having a diameter of 0.015 inch, prepared from this material were translucent tough flexible threads and had a tensile strength above 36,000 pounds per square inch.

The compositions may contain varying amounts of the polyvinyl acetal resins, depending on the use requirements. In the practice of the invention it is preferred to use from about 0.5 to about 40 per cent, and more specifically, between about 2.0 and about 7.5 per cent, of the polyvinyl acetal resin, based on the weight of the polymeric vinylidene chloride product used, but more or less than the suggested amounts may be used.

While the above examples show the preparation of compositions from a polymeric vinylidene chloride product consisting of a co-polymer of 90 per cent vinylidene chloride and 10 per cent vinyl chloride, incorporated with polyvinyl acetal resins, other polymeric vinylidene chloride products which have wide commercial value and which may be advantageously used in preparing the new compositions include the co-polymers containing from about 5 to about 30 per cent of vinyl chloride and correspondingly from about 95 to about 70 per cent of vinylidene chloride. Other co-polymers, in like proportions with vinylidene chloride, as included herein under the definition of the term, "polymeric vinylidene chloride product," form equally valuable compositions.

In preparing molded or extruded articles from the new polymeric vinylidene chloride compositions at temperatures above their respective softening points, where the material is often maintained for a considerable period of time, it is desirable to have present in the composition a heat-stabilizing agent which acts to decrease or prevent thermal decomposition. A substance which will also prevent darkening on exposure to light is often desirable. Compounds applicable for these purposes include 1,2-epoxy-3-(2-phenyl-phenoxy) propane, allyl-disulfide, 2-chloroallyl-disulfide, 2,2'-dihydroxybenzophenone, tributyl aconitate, dipropyl maleate, 2-phenoxyethyl cinnamate, and di-(alpha-phenylethyl) ether.

The incorporation of minor amounts of coloring agents, fillers, plasticizers and the like has also been found to be useful and desirable when used in such amounts that the desirable mechanical properties of the product are not affected.

Other modes of applying the principle of our invention may be employed instead of those explained, change being made as regards the materials employed, provided the product recited in the following claims be obtained.

We therefore point out and distinctly claim as our invention:

1. A thermoplastic composition, the essential ingredients of which are a polymer of vinylidene chloride, wherein the vinylidene chloride constitutes at least 70 per cent of the polymer, and between about 0.5 and about 40 per cent of a polyvinyl-acetal resin, based on the weight of the polymer.

2. A thermoplastic composition, the essential ingredients of which are a polymer of vinylidene chloride, wherein the vinylidene chloride constitutes at least 70 per cent of the polymer, and between about 2 to about 7.5 per cent of a polyvinyl-acetal resin, based on the weight of the polymer.

3. A thermoplastic composition containing a copolymer of from about 5 to about 30 per cent of vinyl chloride and correspondingly, from about 95 to about 70 per cent of vinylidene chloride, and between about 0.5 and about 40 per cent of a polyvinyl-acetal resin, based on the weight of the copolymer.

4. A thermoplastic composition containing a copolymer of from about 5 to about 30 per cent of vinyl chloride and, correspondingly, from about 95 to about 70 per cent of vinylidene chloride, and containing approximately 6 per cent of a polyvinyl-acetal resin, based on the weight of the vinylidene chloride vinyl chloride copolymer.

EDGAR C. BRITTON.
HAROLD W. MOLL.